United States Patent [19]
Frydman

[11] 3,831,916
[45] Aug. 27, 1974

[54] STEEL CONVERTER
[75] Inventor: Natan Frydman, Paris, France
[73] Assignee: Fives Lille-Cail, Paris, France
[22] Filed: Oct. 3, 1972
[21] Appl. No.: 294,666

[30] Foreign Application Priority Data
Oct. 11, 1971  France .............................. 71.36438

[52] U.S. Cl............................. 266/36 P, 266/36 R
[51] Int. Cl.............................................. C21c 5/50
[58] Field of Search .................. 266/36 P, 36 R, 35

[56] References Cited
UNITED STATES PATENTS

| | | | |
|---|---|---|---|
| 3,182,979 | 5/1965 | Krause | 266/35 X |
| 3,337,205 | 8/1967 | Puxkandl | 266/36 P |
| 3,561,744 | 2/1971 | Altman | 266/36 P |
| 3,601,383 | 8/1971 | Mahringer | 266/36 P |
| 3,653,649 | 4/1972 | Mevissen et al. | 266/36 P |
| 3,713,638 | 1/1973 | Langmead et al. | 266/36 P |

*Primary Examiner*—Roy Lake
*Assistant Examiner*—James F. Coan
*Attorney, Agent, or Firm*—Kurt Kelman

[57] ABSTRACT

A steel converter vessel, when in the vertical position, is supported on the trunnion ring solely by four seats fixed to the vessel wall and disposed on respective sides of a diametrical vertical plane containing the trunnion axes and symmetrically in respect of a vertical plane perpendicular thereto. Shoulder clamps are fixed to the trunnion ring and arranged to maintain the seats on the ring. Stop means fixed respectively to the vessel and the trunnion ring take up solely forces parallel to the plane of the trunnion ring, the stop means being disposed adjacent the trunnions.

5 Claims, 3 Drawing Figures

PATENTED AUG 27 1974  3,831,916

STEEL CONVERTER

The present invention relates to improvements in steel converters comprising a vessel having a wall and supported by a trunnion ring circling the vessel with a radial play between the vessel wall and the ring. The ring has two trunnions which are diametrically opposed and which permit the vessel to pivot about a horizontal axis along which the axes of the trunnions are aligned.

It is the primary object of the invention to improve the type of converter wherein the connection between the converter vessel and the trunnion ring is provided by seats fixed to the vessel wall and maintained on the trunnion ring by means of shoulder clamps fixed to the ring.

In known converters of this type, six or eight seats rest on the upper face of the trunnion ring when the converter vessels is in its vertical position and its nose is at its uppermost position. Since the converter vessel wall is practically not deformable under the influence of axial forces when the trunnion ring is substantially bent when subjected to such forces, the distribution of the load between the seats is very unequal. Furthermore, since the play between the seats and the shoulder clamps is limited to avoid shocks when the vessel is pivoted, the ring cannot be deformed freely, which further increases the uneven distribution of the load over the seats.

It is the object of this invention to remedy this disadvantage in the interconnection between the vessel and the trunnion ring so as to obtain a uniform distribution of forces on all seats.

The above and other objects are accomplished according to the invention by disposing four seats fixed to the vessel on respective sides of a diametrical vertical plane containing the trunnion axes and symmetrically in respect of a vertical plane perpendicular thereto. The four seats constitute the sole support of the vessel on the upper face of the trunnion ring when the vessel is in the vertical position. Shoulder clamps are fixed to the trunnion ring and are arranged to maintain the seats on the ring, and stop means are fixed respectively to the vessel and the trunnion ring for taking up solely forces parallel to the plane of the trunnion ring, the stop means being disposed adjacent the trunnions.

The above and other objects, advantages and features of the present invention will become more apparent from the following detailed description of a now preferred embodiment thereof, taken in conjunction with the accompying drawing where FIG. 1 is an elevational side view of a steel converter according to this invention;

Figure 1:
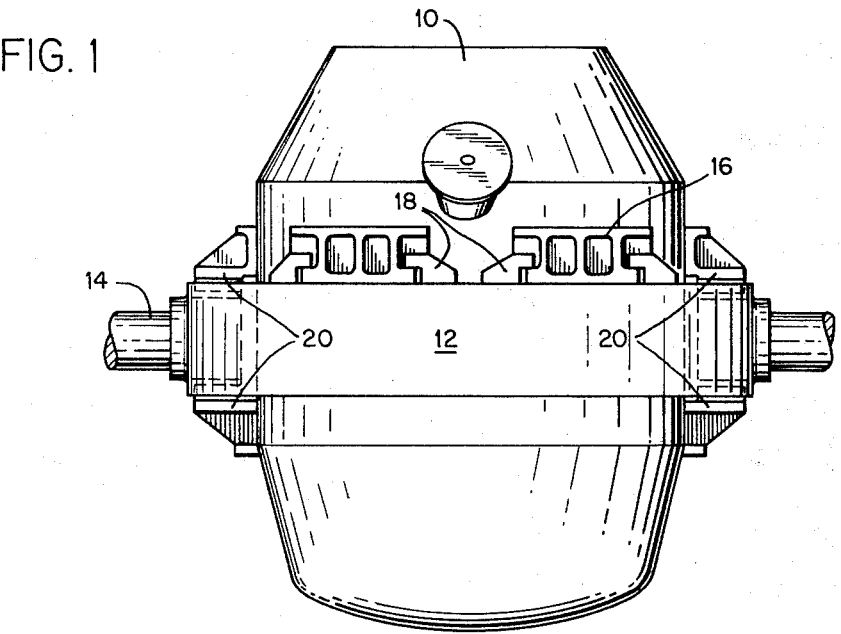

Referring now to the drawing, there is shown a vessel converter 10 and a trunnion ring 12 provided with two trunnions 14 mounted on fixed bearings (not shown) so as to enable the converter vessel to be pivoted about a horizontal axis defined by the axes of the trunnions which are aligned along a horizontal diameter of the vessel and ring.

The interconnection between the vessel and the trunnion ring is effected by means of four seats 16 fixed to the wall of the vessel, for instance by being soldered thereto. As shown in FIG. 1, when the vessel is in the upright or vertical position, with its nose uppermost, the seats rest on the upper face of the trunnion ring.

Figure 2:
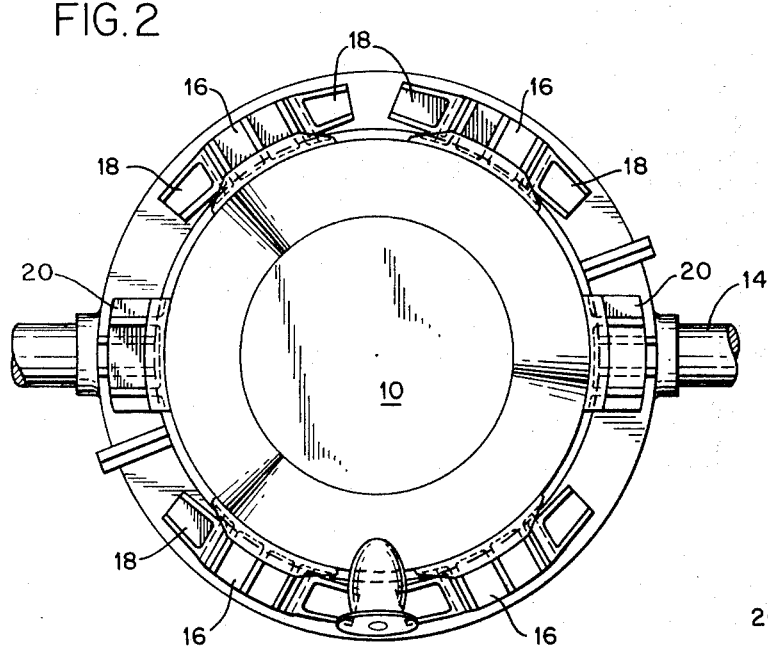
FIG. 2 is a plan view of this converter.
Figure 3:
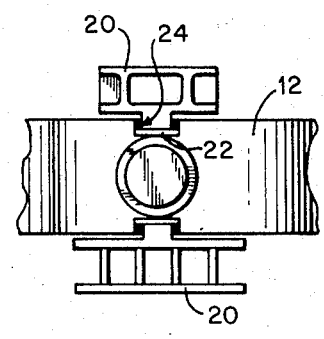
FIG. 3 is a partial side view showing a structural detail.

As seen in FIG. 2, the four seats 16 are disposed on respective sides of the diametric vertical plane containing the trunnion axes and symmetrically in respect of the diametric vertical plane perpendicular thereto. The seats are maintained on the trunnion ring by shoulder clamps 18 which prevent the vessel from turning about its axis and which support it when the vessel is pivoted out of the vertical position, i.e., when the vessel nose is lowered.

Some play is provided between the seats and the shoulders to permit differential expansion of the converter vessel and the trunnion ring. The play between the seats and the shoulders is so chosen that it is completely resorbed during normal operation of the converter so as to avoid shocks between the vessel and the ring during pivoting of the vessel.

Stops constituted by tenons or studs 20 fixed to the vessel are provided to take up the forces parallel to the plane of the trunnion ring. The tenons 20 are disposed at the trunnions in diametrically opposed relationship and are engaged by notches 22 in the upper and lower faces of the trunnion ring. Wedges 24 are positioned between the tenons and the notches.

The play between the faces of the tenons and notches, which are perpendicular to the axis of the vessel, is sufficient for these faces never to come in contact with each other. Therefore, the tenons only transmit forces parallel to the plane of the trunnion ring and serve to take up the coupling during pivoting of the vessel as well as a portion or all of the weight of the vessel when it is inclined or in the horizontal position.

Other stop means may be used to take up the forces parallel to the plane of the trunnion ring, if desired.

When the vessel is in the vertical position, it is supported on the trunnion ring solely by the four seats resting on the upper face of the trunnion ring when the nose of the vessel is in the uppermost position and hanging therefrom, by means of the shoulder clamps, when the vessel nose is lowered.

In this manner, the trunnion ring is free to be deformed when it is under load and the loads on the four seats are practically equal when the vessel is in the vertical position.

I claim:

1. A steel converter comprising
   1. a vessel having a wall
   2. a trunnion ring having an upper face and encircling the vessel with a radial play between the vessel wall and the ring,
   3. two trunnions on the ring,
      a. the axes of the trunnions being aligned along a horizontal diameter for pivoting the vessel between a vertical and an inclined position,
   4. four seats fixed to the vessel wall and disposed on respective sides of, and spaced from, a diametrical vertical plane containing the trunnion axes and symmetrically in respect of a vertical plane perpendicular thereto,
      a. the four seats constituting the sole support of the vessel on the upper face of the trunnion ring when the vessel is in the vertical position,
   5. shoulder clamps fixed to the trunnion ring and arranged to maintain the seats on the ring, and 6. stop means fixed respectively to the vessel and the trunnion ring for taking up solely forces parallel to the plane of the trunnion ring,
   a. the stop means being disposed adjacent the trunnions.

2. The steel converter of claim 1, wherein the stop means are constituted by tenons fixed to the vessel and engaging notches in the ring adjacent the trunnions.

3. The steel converter of claim 1, wherein the stop means are disposed diametrically opposed.

4. The steel converter of claim 1, wherein the four seats are spaced farther from the diametrical vertical plane containing the trunnion axes than from the vertical plane perpendicular thereto.

5. The steel converter of claim 1, wherein the four seats are disposed in respective diametrical planes adjacent a plane substantially bisecting the angle between the vertical planes.

* * * * *